United States Patent [19]

Dutson et al.

[11] Patent Number: 5,031,472
[45] Date of Patent: Jul. 16, 1991

[54] NEUTRAL SENSING ASSEMBLY

[75] Inventors: Brian J. Dutson, Whelley; Trevor Pitchford, Little Lever, both of England

[73] Assignee: Eaton Corporation, Cleveland, Ohio

[21] Appl. No.: 473,487

[22] Filed: Feb. 1, 1990

[30] Foreign Application Priority Data

Feb. 11, 1989 [GB] United Kingdom ............ 8903132
May 6, 1989 [GB] United Kingdom ............ 8910448

[51] Int. Cl.⁵ ............................................. F16H 59/68
[52] U.S. Cl. ................................... 74/335; 74/475;
 74/DIG. 7; 340/456; 200/61.91
[58] Field of Search ................. 74/335, 337.5, 475,
 74/DIG. 2; 340/456; 200/61.91

[56] References Cited

U.S. PATENT DOCUMENTS

| | | | |
|---|---|---|---|
| 1,410,116 | 3/1922 | Pomeroy | 74/475 |
| 3,104,558 | 9/1963 | Herr, Jr. | 74/475 |
| 3,534,637 | 10/1970 | Tomlinson | 74/745 |
| 4,083,420 | 4/1978 | Kurisu | 180/82 C |
| 4,120,212 | 10/1978 | Philipsen | 74/476 |
| 4,550,627 | 11/1985 | Lauer et al. | 74/475 |
| 4,899,607 | 2/1990 | Steinton | 74/335 |
| 4,945,484 | 7/1990 | Cote et al. | 74/335 X |

FOREIGN PATENT DOCUMENTS

| | | |
|---|---|---|
| 1750590 | 1/1972 | Fed. Rep. of Germany . |
| 2163761 | 6/1973 | Fed. Rep. of Germany . |
| 23777 | 11/1908 | United Kingdom .......... 74/475 |

Primary Examiner—Allan D. Herrmann
Assistant Examiner—Benjamin Levi
Attorney, Agent, or Firm—H. D. Gordon

[57] ABSTRACT

A neutral sensing assembly for a multiple shift rail (60B, 62B, 64B) shift bar housing assembly (70) is provided. The neutral sensing assembly utilizes a single two-position sensing (112, 114) and a relatively simply shaped neutral sensing bar (104) extending generally transverse to the axes (80, 82, 84) of the shift rails and interacting with neutral sensing notches (60C, 62C, 64C) for displacing the neutral sensing bar (FIG. 4 and 6) sufficiently to actuate the sensing upon axial displacement of any of the shift rails sufficient to cause the transmission (10) to be engaged in a not neutral condition.

5 Claims, 4 Drawing Sheets

NEUTRAL SENSING ASSEMBLY

BACKGROUND OF INVENTION

1. Related Application

This application is related to British Application Ser. No. 8903132.3 filed Feb. 11, 1989.

2. Field of the Invention

This invention relates to a sensing assembly for sensing a transmission neutral condition, and, in particular, to a relatively simple and reliable sensing assembly for use in connection with a multiple shift rail or shift rod transmission shift bar housing assembly for sensing a transmission neutral condition.

3. Description of the prior Art

Multiple speed change gear simple transmissions and/or compound multiple speed transmissions having a multiple speed main transmission section including a multiple shift rod (also called shift rails and/or shift bars) shift bar housing assemblies are well known in the prior art as may be seen by reference to U.S. Pat. Nos. 3,283,613; 4,735,109; 4,788,889 and 4,754,665, the disclosures of which are hereby incorporated by reference.

When such transmissions or transmission sections are utilized with auxiliary transmission devices, such as auxiliary transmission sections, multiple speed drive axles, multiple speed transfer cases or the like, and/or when used with automatic and/or semiautomatic drivetrain control devices, it is often important to have an accurate signal indicative of a transmission neutral, or not neutral, condition. Transmission shift bar housing neutral sensing devices comprising a plurality of separate sensing devices or switches for sensing axial displacement of each of a plurality of separate shift rails from the axially nondisplaced neutral positions thereof may be seen by reference to U.S. Pat. Nos. 4,722,237, and 4,445,393, the disclosures of which are hereby incorporated by reference. Transmission shift bar housing neutral sensing devices comprising an axially displaceable rod having a plurality of specially contoured ramps and grooves (after referred to as a "Christmas tree" shaped rod) extending transverse the axes of the shift rails and cooperating with specifically contouring grooves/ramps therein are known in the prior art as may be seen by reference to U.S. Pat. Nos. 4,676,115 and 4,290,515, the disclosures of which are hereby incorporated by reference.

While the prior art devices were effecting to provide signals indicative of a transmission neutral or not neutral condition, they were not totally satisfactory as they tended to be more complicated and expensive than desired.

SUMMARY OF THE INVENTION

In accordance with the present invention, the drawbacks of the prior art have been minimized or overcome to the extent that a relatively simple and inexpensive, yet reliable, sensing assembly is provided for a multiple shift rail transmission shift bar housing assembly for providing signals indicative of the neutral or not neutral condition of the transmission.

The above is accomplished by providing each of the shift rails of the shift bar housing assembly with a relatively simple groove, preferably an upwardly facing groove or notch, therein, all of which grooves will be in axial alignment when all of the shift rails are in the axially nondisplaced neutral positions thereof. A relatively simple and easily produced sensing bar, which may be of a generally rectangular or of a generally annular cross-sectional shape, extends transverse the axes of the shift rails and is receivable within the grooves or notches formed therein. A single sensing device having a sensing member or plunger axially displaceable along an axis generally perpendicular to the plane defined by the axes of the shift rails is provided which sensing member defines a first position for providing a signal indicative of the transmission being in the neutral condition and a second position for providing a signal indicative of the transmission being in the not neutral condition thereof. The sensing bar will assume a first position within the notches when all of the notches are axially aligned and a second position displaced in the direction of the axis of the sensing plunger when one of said shift rails is axially displaced sufficiently to cause engagement of said transmission. The sensing bar cooperates with the sensing element to position the sensing element between the first and second positions thereof upon movement of the sensing bar between the first and second positions thereof.

Preferably, each of the notches in each of the shift rails is defined by a pair of axially and radially inwardly extending ramps extending from a radially outer land portion to a radially depressed base portion. The sensing bar is adapted to be received in contact with the base portions of those shift rails in the neutral positions thereof and to contact the outer land portion of a shift rail sufficiently axially displaced to cause engagement of the transmission. The sensing bar is preferably guided in such a manner that engagement thereof with one of the ramp portions of a shift rail partially axially displaced from the neutral position thereof, but insufficiently axially displaced to cause engagement of the transmission, will not result in displacement of the sensing bar sufficient to cause the sensing plunger to assume the second position thereof.

Accordingly, it is the object of the present invention to provide a relatively simple and inexpensive, yet reliable, neutral sensing assembly for use with a multiple shift rail transmission shift bar housing assembly.

This and other objects and advantages of the present invention will become apparent from a reading of the detailed description of the preferred embodiment taken in connection with the attached drawings.

DESCRIPTION OF THE PREFERRED EMBODIMENT

Figure 1:
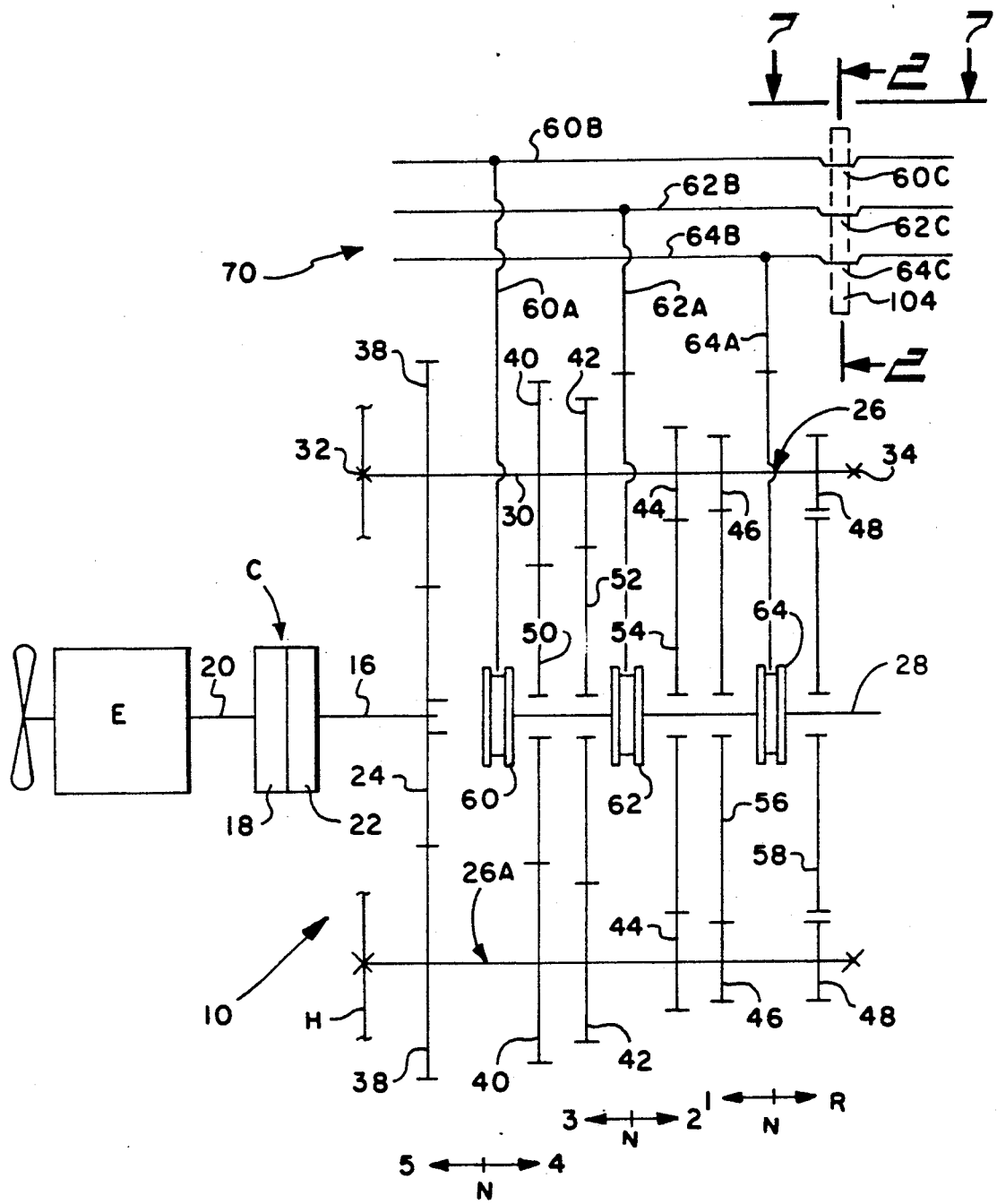
FIG. 1 is a schematic illustration of a typical change gear transmission utilizing a multiple shift rail shift bar housing assembly and the neutral sensing assembly present invention.

Certain terminology will be used in the following description for convenience only and will not be limiting. The words "upwardly", "downwardly", "rightwardly" and "leftwardly" will designate directions in the drawings to which reference is made. The words "forward" and "rearward" will refer respectfully to the front and rear ends of the transmission as conventionally mounted in a vehicle, being respectfully to the left and right sides of the transmission as illustrated in FIG. 1. The words "inwardly" and "outwardly" will refer to directions towards and away from, respectively, the geometric center of the device and designated parts thereof. Said terminology includes the words above specifically mentioned, derivatives thereof and words of similar import.

Referring now to FIG. 1, there is schematically illustrated a well known and highly commercially successful simple transmission 10. Simple transmission 10 may define the main transmission section to be connected in a series with an auxiliary transmission section to define a compound transmission as is well known in prior art. Typically, transmission 10 is housed within a housing H and includes an input shaft 16 driven by a prime mover such as a diesel engine E through a selectively disengaged normally engaged friction master clutch C having an input or driving section 18 drivingly connected to the engine crankshaft 20 and a driven portion 22 rotatably fixed to the transmission input shaft 16.

In transmission 10, the input shaft 16 carries an input gear 24 for simultaneously driving a plurality of substantially identical countershaft assemblies 26 and 26A at substantially identical rotational speeds. In transmission 10 illustrated, two substantially identical countershaft assemblies are provided on diametrically opposite sides of a mainshaft 28 which also defines the output shaft of transmission 10 and which mainshaft is generally coaxially aligned with the input shaft 16. Each of the countershaft assemblies 26 and 26A comprises a countershaft 30 supported by bearings 32 and 34 in housing H, only a portion of which is schematically illustrated. Each of the main section countershafts 30 is provided with an identical grouping of countershaft gears 38, 40, 42, 44, 46 and 48, fixed for rotation therewith. A plurality of drive or mainshaft gears 50, 52, 54, 56 and 58 surround the mainshaft 28 in a selectively clutchable, one at a time, to the mainshaft 28 for rotation therewith by sliding clutch collars 60, 62 and 64 as is well known in the art. Clutch collar 60 may also be utilized to clutch input gear 24 to mainshaft 28 to provide a direct drive relationship between input shaft 16 and mainshaft 28.

Preferably, each of the mainshaft gears encircles the mainshaft 28 and is in continuous meshing engagement with and is floatingly supported by the associated countershaft gear groove, which mounting means in the special advantages resulting therefrom are explained in greater detail in U.S. Pat. Nos. 3,105,395 and 3,335,616, the disclosures of which are hereby incorporated by reference. Typically, clutch collars 60, 62 and 64 are axially positioned by means of shift forks 60A, 62A, and 64A, associated with a shift bar housing assembly to be described in greater detail below. Clutch collar 60, 62 and 64 may be of the well known nonsynchronized double acting jaw clutch type.

It is understood that although the present invention is illustrated as utilized in connection with the well-known and commercially successful multiple identical countershaft, floating mainshaft and floating mainshaft gear type, the advantages of the present invention are equally applicable to transmissions of the single countershaft where nonidentical multiple countershaft type.

Mainshaft gear 58 is the reverse gear and is the continuous meshing engagement with countershaft gears 48 by means of conventional intermediate idler gears (not shown).

Jaw clutches 60, 62, and 64 are three position clutches in that they may be positioned in an axially centered nonengaged position as illustrated or in a fully rightwardly engaged or fully leftwardly engaged position. The jaw clutches are positioned to one of the three positions thereof by means of the shift forks 60A, 2A and 64A which in turn are positioned by means of a shift bar housing assembly 70 as is well known in the prior art. Briefly, shift bar housing assembly 70 includes a shift bar housing 72 which is mountable to the transmission housing H, usually at an upper opening thereof allowing the shift forks to extend therethrough. The shift bar housing 72 defines a plurality of substantially parallel bores 74, 76 and 78 in which shift rails 60B, 62B and 64B, respectively, are slideably received.

As is well known in the prior art, shift forks 60A, 62A and 64A, respectively, are actually fixed to the shift rails 60B, 62B and 64B, respectively, for axial movement therewith. Accordingly, the axial positioning of the three position jaw clutch collars 60, 62 and 64 is controlled by selectively axially positioning of the shift rails. Preferably, as is well known in the prior art, the shift bar housing assembly 70 includes an interlock mechanism (not shown) to prevent displacement of more than one of the shift rails from the neutral nonaxially displaced positions thereof at a time. Selective axial positioning of the shift rails may be accomplished by a manual or automatic mechanism such as a shift lever or the like as is well known in the prior art. The bores 74, 76 and 78 provided in the shift bar housing 72 extend substantially parallel to the axes of rotation of the mainshaft 28 and defined axes 80, 82 and 84, respectively, lying on and defining a single plane 86.

Figure 7:
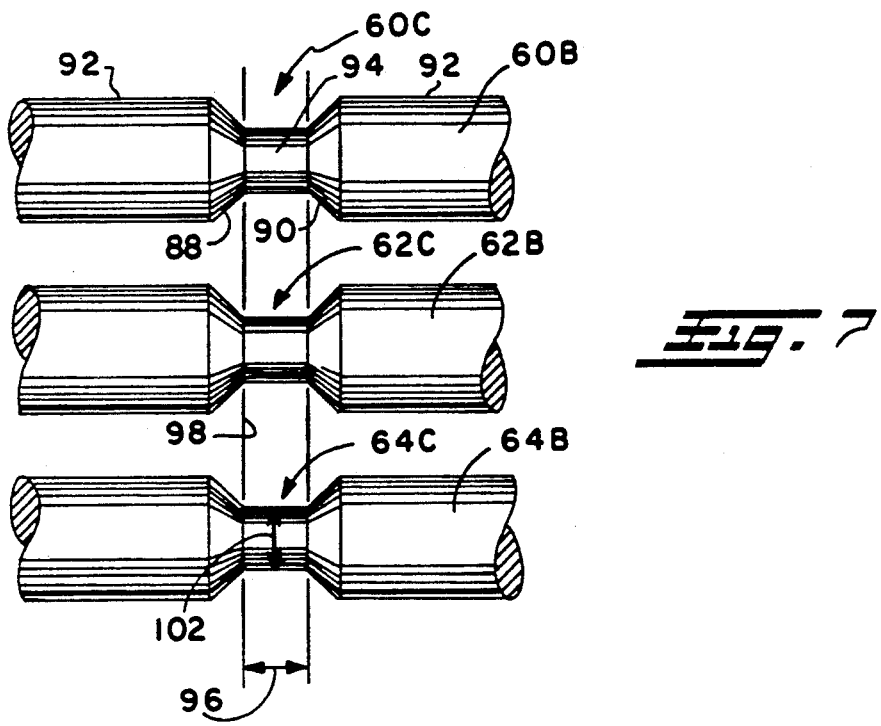
FIG. 7 is an enlarged fragmentary view of the shift rails taken substantial along line 7—7 in FIG. 1.
Figure 8A:
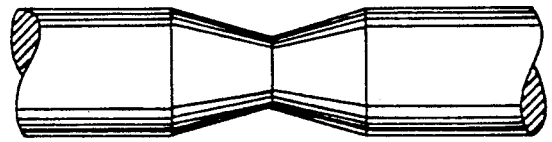
FIG. 8A and 8B illustrate alternate sensing notch structures.
Figure 8B:

Each of the shift rails 60B, 62B and 64B, respectively, defines a neutral sensing notch, 60C, 62C and 64C, respectively, which will all be axially aligned when all of the shift rails are in the neutral nonaxially displaced positions thereof, as illustrated in FIGS. 1 and 7. Each of the neutral sensing notches, 60C, 62C and 64C comprise a pair of ramp portions 88 and 90 extending axially and radially inwardly from the outer land portion 92 of the shift rails to a radially recessed axially extending base portion 94 having an axial length of 96.

The shift bar housing 70 also defines a bore or passage 98 extending transverse to the axes 80, 82 and 84 of the shift rails and parallel to and spaced from the plane 86 defined by the axes of the shift rails. Passage 98 will intersect the bores 74, 76 and 78 at a distance 100 from the plane 86, no greater than the radius 102 of the recessed base portion 94 of the neutral sensing grooves.

A neutral sensing member 104, preferably in the form of a bar member having a generally rectangular or a generally annular cross section with a width less than the axial length 96, and a height 106 less than the height of passage 98 is received within passage 98, and guided by guide members 110 for movement in a direction substantially perpendicular to plane 86. Preferably, guide members 110 are relatively simple and comprise a pin and bore structure extending substantially perpendicular to plane 86.

Figure 9:
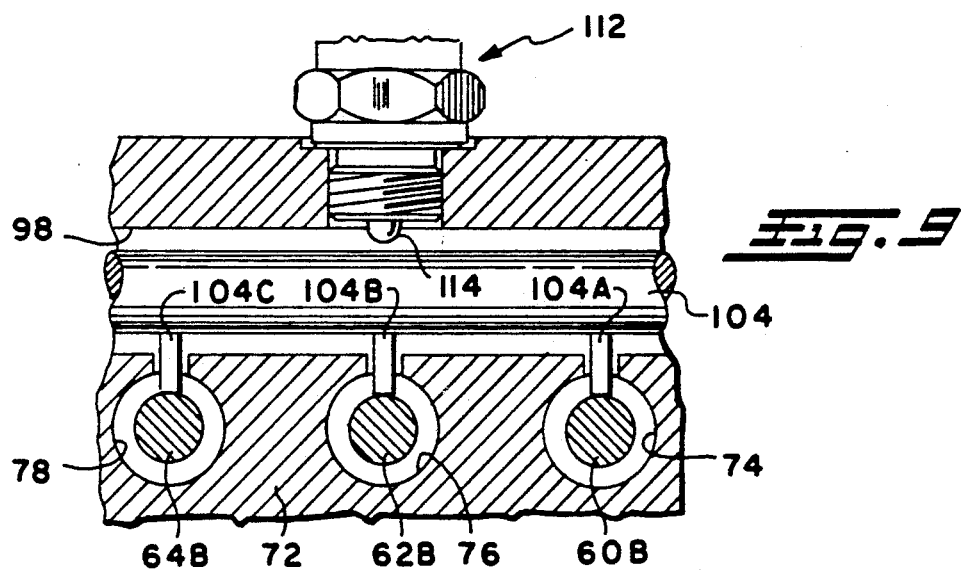
FIG. 9 illustrates an alternate embodiment.

An alternate embodiment is seen in FIG. 9 wherein passage 98 does not intersect the bores 74, 76 and 78 and spacers 104A, 104B and 104C interact within the notches and sensor bar 104.

Figure 2:
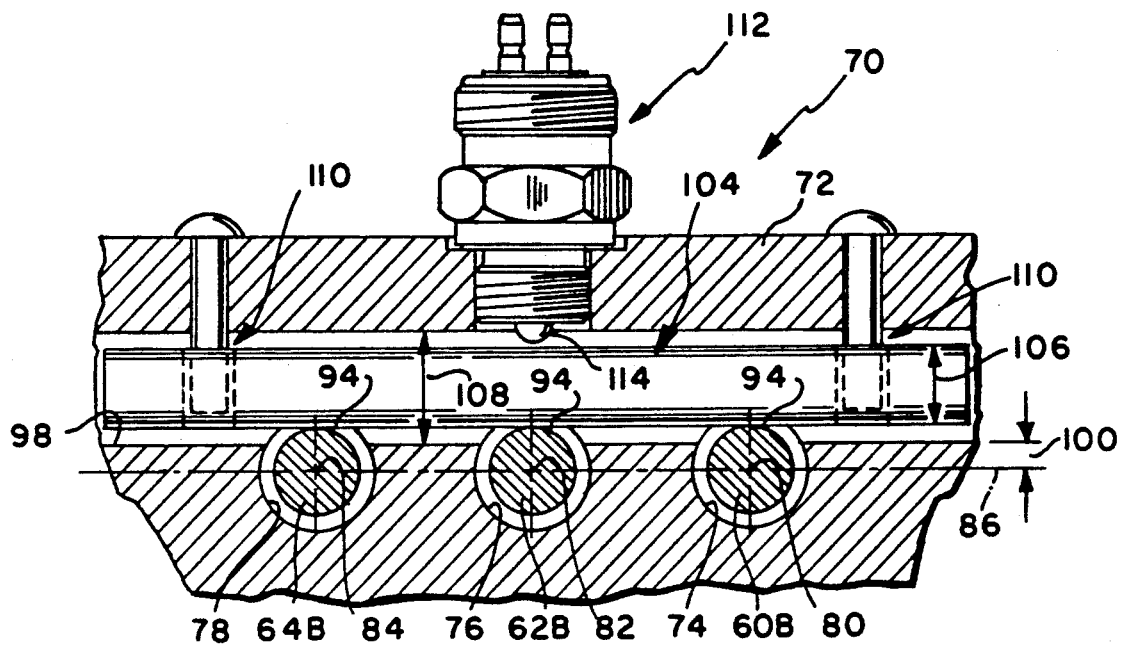
FIG. 2 is a fragmentary cross-sectional view of the shift bar housing assembly and neutral sensing assembly of the present invention taken substantially along lines 2—2 in FIG. 1.
Figure 3:
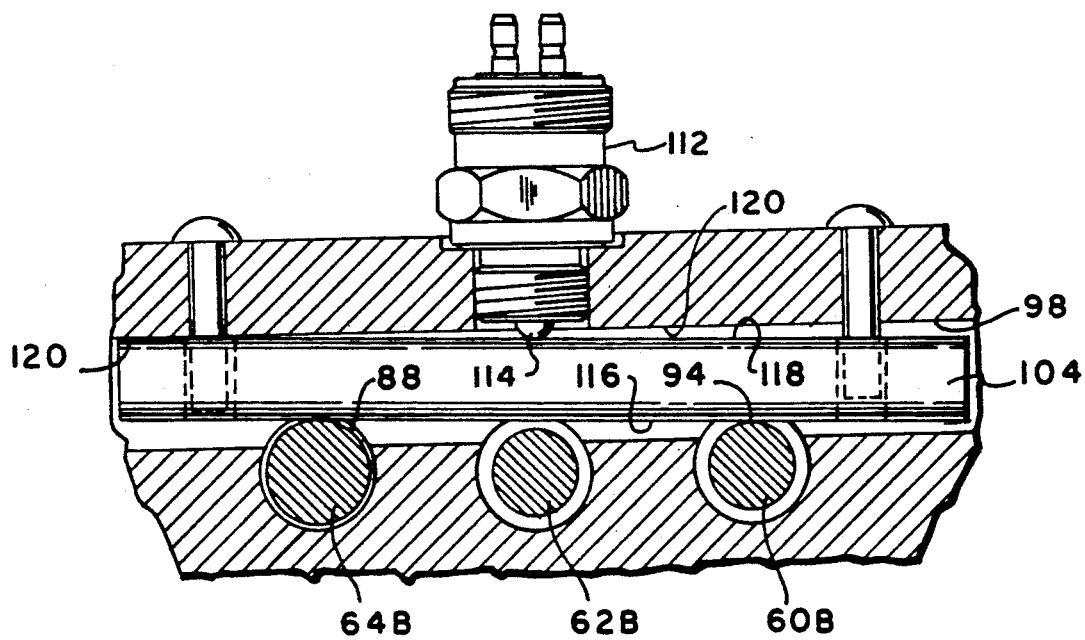
FIGS. 3, 4, 5, and 6 are fragmentary cross-sectional views similar to FIG. 2 illustrating the shift bar housing assembly and neutral sensing assembly positions f various axial displacements of the shift rails.

The neutral sensing assembly of the present invention also includes a two-position sensing device or sensing member 112 for providing a signal indicative of depression or extension of its sensing element or plunger 114 which is axially upwardly depressable in a direction perpendicular to plane 86. FIGS. 2, 3 and 5 illustrate the sensing device 112 with its sensing element 114 fully axially downwardly extended while FIGS. 4 and 6 illustrate the sensing member 112 with its sensing element 114 axially upwardly depressed.

As may be seen by reference to FIGS. 1, 2 and 7, when all of the shift rails are in the axially nondisplaced neutral positions thereof, the neutral sensing notches, 60C, 62C and 64C, will all be axially aligned with one another and with passage 98 and the neutral sensing bar 104 will be supported on the radially inward recessed base portions 94 of all of the notches. In this position, as is shown in FIG. 2, the neutral sensing bar 104 is in its first or closest to plane 86 position and is not in contact with sensing element 114 which is in its fully axially downwardly extended position. This is the position wherein sensing device 112 provides a transmission neutral signal.

Figure 4:
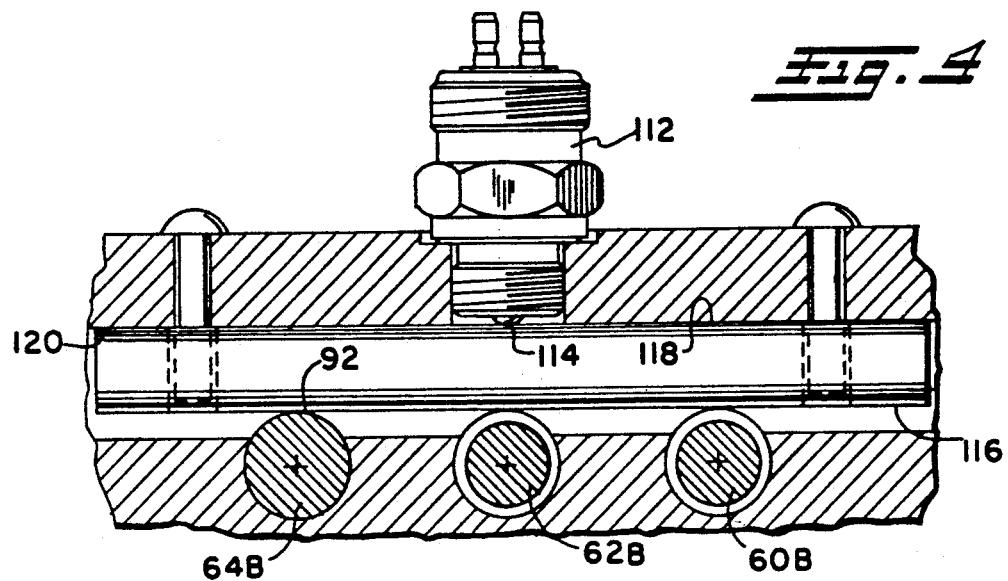
Figure 5:
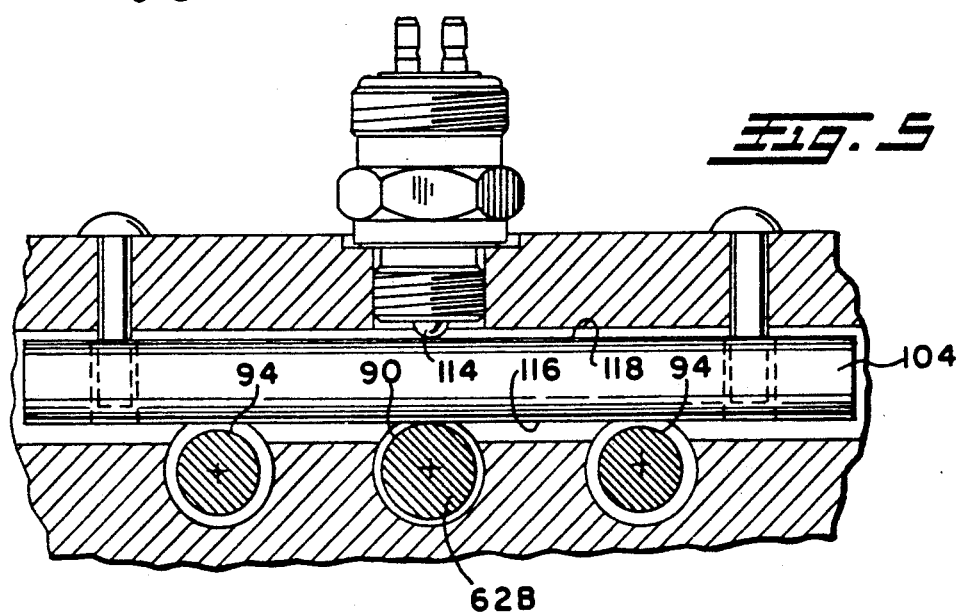

FIGS. 3 and 4 illustrate the condition of the neutral sensing assembly of the present invention as one of the outer shift rails, such as the shift rail 64B controlling jaw clutch 64 for selective engagement of reverse or first speed, is moved towards partial and then full engagement. As the shift rail 64B is moved rearwardly or to the right as seen in FIG. 1, the bottom edge 116 of neutral sensing bar 104 will continue to engage the base portion 94 of shift rail 60B and the ramp portion 88 of shift rail 64B, causing the rightward end of the sensing bar 104 to pivot upwardly about base portion 94 of shift rail 60B until the upper surface 118 of the sensing bar 104 contacts the upper surface 120 of bore 98 as at contact point 120. At this point in time, the upper surface 118 of sensing bar 104 will just come into contact with plunger sensing element 114 of the sensing member 112 but will not yet depress same. As further movement of shift rail 64B towards the axially displaced position sufficient to engage the reverse mainshaft gear 58 to the mainshaft 28 occurs, as is seen in FIG. 4, the lower surface 116 of the neutral sensing bar 104 will be contacted by and urged upwardly by the outer land portion 92 of the shift rail 64B causing the entire rightward portion of the shift bar to pivot upwardly about contact point 120 causing engagement of and axially upward depression of the sensing member 114 into the sensing member 112 which will result in sensing member 112 providing a not neutral signal.

Figure 6:
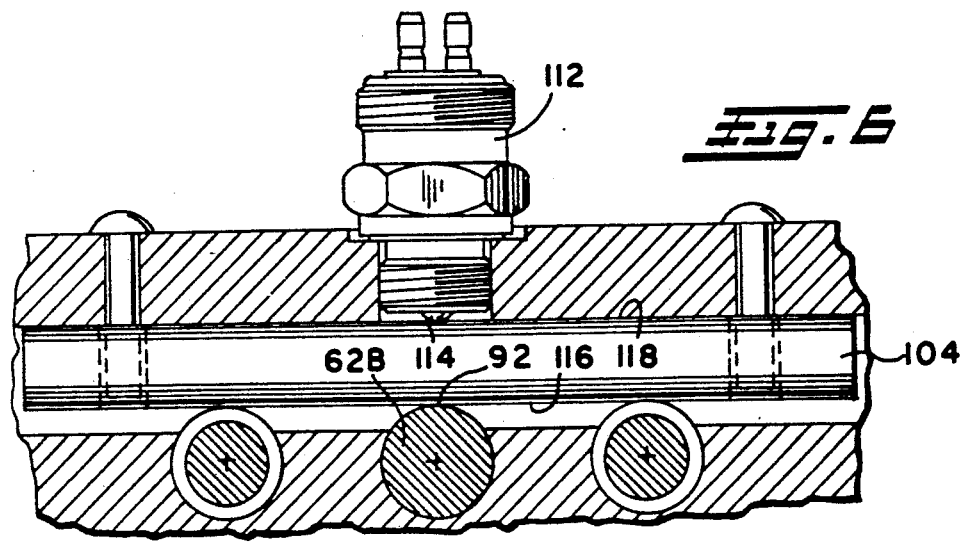

FIGS. 5 and 6 illustrate the condition of the neutral sensing assembly of the present invention as the central shift rail 62B is axially displaced from the nondisplaced condition thereof to a position of axial displacement sufficient to cause engagement of clutch 62 to engage the second or third speed mainshaft gears 54 and 52 to the mainshaft 28. As may be seen by reference to FIG. 5, as the shift rail 62B is partially axially displaced leftwardly towards the position wherein clutch 62 will cause engagement of gear 52 to the mainshaft 28, the lower surface 116 of sensing bar 104 will engage and be urged upwardly by the ramp surface 90 of the shift rail 62B. In this partially axially displaced condition, the upward axial displacement of the upper surface 118 of the neutral sensing bar is insufficient to cause upward axial depression of the sensing member 114. However, as may be seen by reference to FIG. 6, further axial displacement of the shift rail 62B will cause the lower surface 116 of neutral sensing bar 104 to engage the land portion 92 of the shift rail 62B and force the shift bar 104 upwardly sufficiently that the upper surface 118 of the sensing bar 104 will engage and axially depress the sensing element 114 sufficiently to cause the sensing member 112 to provide a not neutral signal.

While a relatively simple depressible plunger type sensing device 112 is illustrated, other types of sensing devices for sensing movement of sensing bar 104 from the first to the second positions thereof may be utilized in the present invention.

Although the preferred embodiment of the present invention has been described above with a certain degree of particularity, it is understood that certain substitutions and rearrangements of the parts thereof is possible without departing from the spirit and the scope of the present invention as hereinafter claimed.

We claim:

1. A neutral sensing assembly for sensing axial displacement of one of at least three parallel shift rails (60A, 62A, and 64A) from a centered axially nondisplaced position thereof in a shift bar housing assembly (70), each of said shift rails axially movable in substantially parallel bores (74, 76 and 78, respectively) provided in a shift bar housing (72) and having a neutral sensing notch (60C, 62C, 64C, respectively) therein, all of said neutral sensing notches axially aligned when all of said shift rails are in the centered axially nondisplaced positions thereof, said neutral sensing assembly characterized by:

a neutral sensing bar (104) received in a passage (98) provided in said shift bar housing and extending substantially transverse the axes (80, 82, 84) of said shift rails, means for guiding said neutral sensing bar for movement in a direction substantially perpendicular to a plane (86) defined by the axes of said shift rails, members (104A-104C) associated with said neutral sensing bar receivable within said neutral sensing notches when all of said shift rails are in the nonaxially displaced positions thereof, said neutral sensing bar defining a first position (FIG. 1) wherein said neutral sensing bar is substantially parallel to and at a minimum displacement from said plane (86) and a second position (FIGS. 4 and 6) wherein said neutral sensing bar is substantially parallel to and a maximum displacement from said plane (86), movement of any of said shift rails from the axially nondisplaced position thereof too a fully axially displaced condition thereof, causing said neutral sensing bar to be forced from the first to the second position thereof, and a sensing device (112) for sensing movement of said neutral sensing bar from the first to the second positions thereof, said sensing device (112) including a displaceable member (114) displaceable in a direction substantially perpendicular to said plane (86) for providing signals indicative of axial displacement of any of said shift rails from the centered axially nondisplaced positions thereof, said neutral sensing bar engaging said displaceable member and displacing same in the second position thereof.

2. The neutral sensing assembly of claim 1 wherein each of said sensing notches (60C, 62C and 64C) comprises a pair of radially and axially inwardly extending ramp portions (88, 90) extending from an enlarged outer diameter land portion (92) to a base portion (94) having axial length (96), said neutral sensing bar being of a substantially rectangular cross-sectional shape, the width of said neutral sensing bar being no greater than the axial length (96) of said base portion of said neutral sensing notches.

3. The neutral sensing assembly of claim 1 wherein said displaceable member 114) of said sensing device (112) is located substantially midway between the axes (80 and 84) of the outermost ones of said shift rails (60B, 64B).

4. The neutral sensing assembly of claim 1 wherein said means for guiding said neutral sensing bar (110) comprise a pair of spaced apart bores extending generally perpendicular to said plane and provided in one of said shift bar housing and said neutral sensing bar and a pair of spaced apart pins provided in the other of said shift bar housing and said neutral sensing bar, said pins slideably received within said spaced apart bores.

5. The neutral sensing assembly of claim 1 wherein said members associated with said neutral sensing bar comprise a portion of said neutral sensing bar (FIG. 9).

* * * * *